United States Patent [19]

Ferrigno

[11] 4,025,383

[45] May 24, 1977

[54] HOME BAG SEALER

[76] Inventor: Albert R. Ferrigno, 9 Ravine Road, Great Neck, N.Y. 11023

[22] Filed: Aug. 2, 1976

[21] Appl. No.: 711,098

[52] U.S. Cl. .................................. 156/530; 156/583

[51] Int. Cl.$^2$ .................... B32B 31/00; B30B 15/34

[58] Field of Search .................... 156/510, 530, 583

[56] References Cited

UNITED STATES PATENTS

| | | | |
|---|---|---|---|
| 3,092,018 | 6/1963 | Turner | 156/583 |
| 3,196,067 | 7/1965 | Techtmann | 156/583 |
| 3,671,357 | 6/1972 | Trouichet | 156/583 |
| 3,764,434 | 10/1973 | Bridenstine | 156/583 |
| 3,847,712 | 11/1974 | Hubbard | 156/583 |

*Primary Examiner*—Douglas J. Drummond

[57] ABSTRACT

Apparatus for forming bags of desired length from flattened plastic tubular stock material and subsequently sealing them at the open end thereof. The apparatus includes housing means having supporting means within the housing means for rotatably mounting a supply roll of the flattened stock material, with guide means in vertically spaced relationship to the supporting means cooperating with advancing means including a pair of rollers for engagement with the stock within the housing means in vertically spaced apart relationship to said guide means. Base means and heat sealing means form a pair of transversely extending seals. Dual cutting means cuts the bag to any desired length and a vertical slot between the seams is formed as a pouch for inserting a label to identify the contents. The apparatus also includes means to seal the open end of the bag with the contents therein.

30 Claims, 12 Drawing Figures

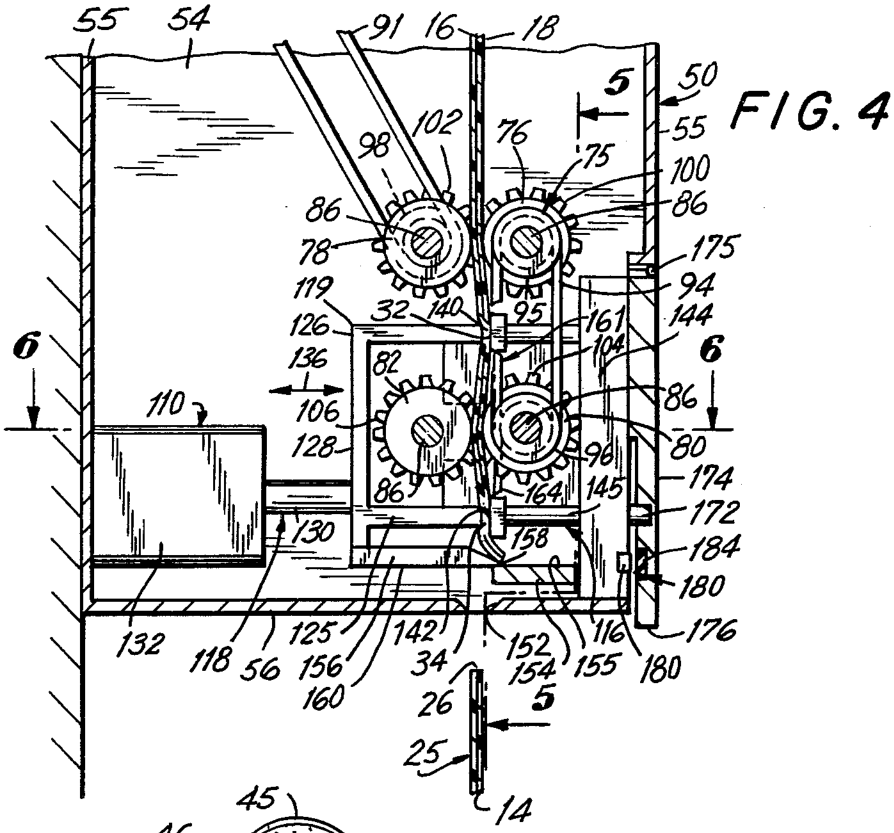
FIG. 4
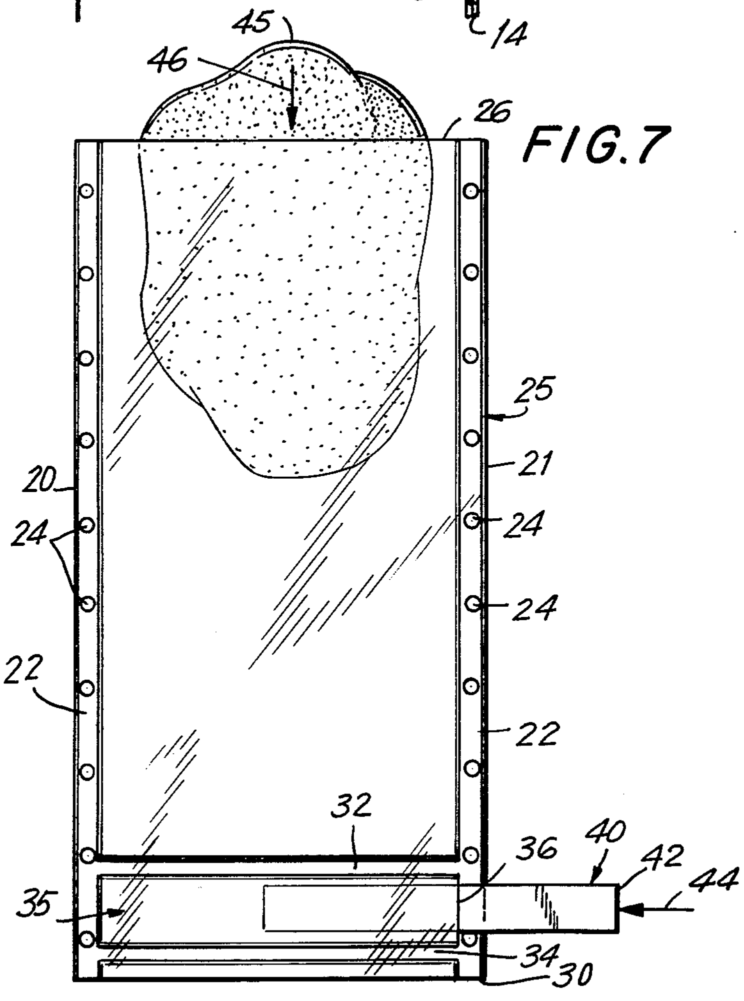
FIG. 7
FIG. 8
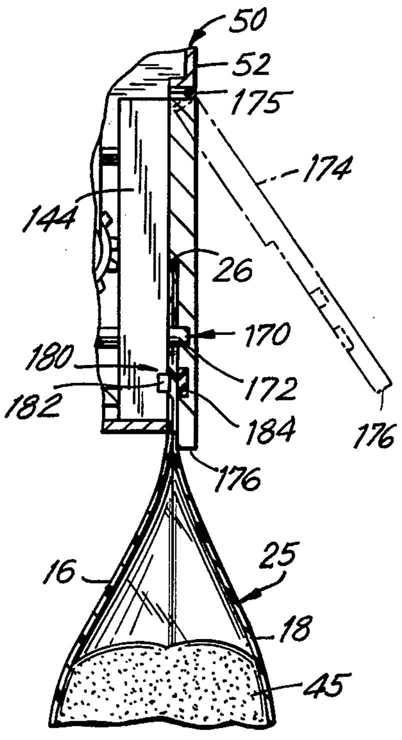

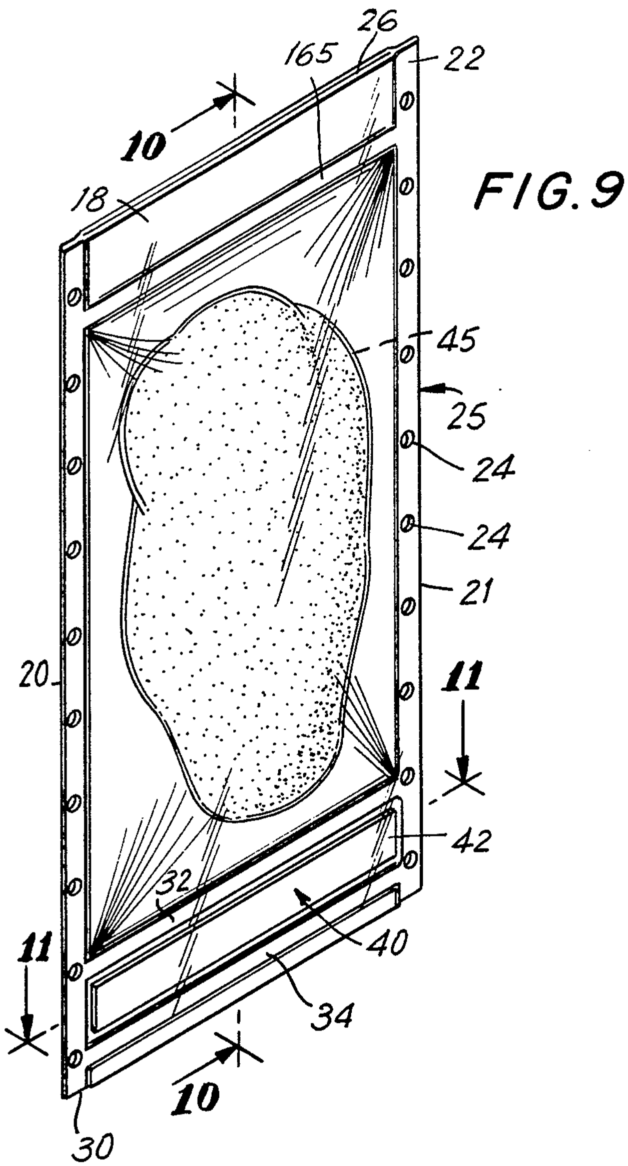
FIG. 9
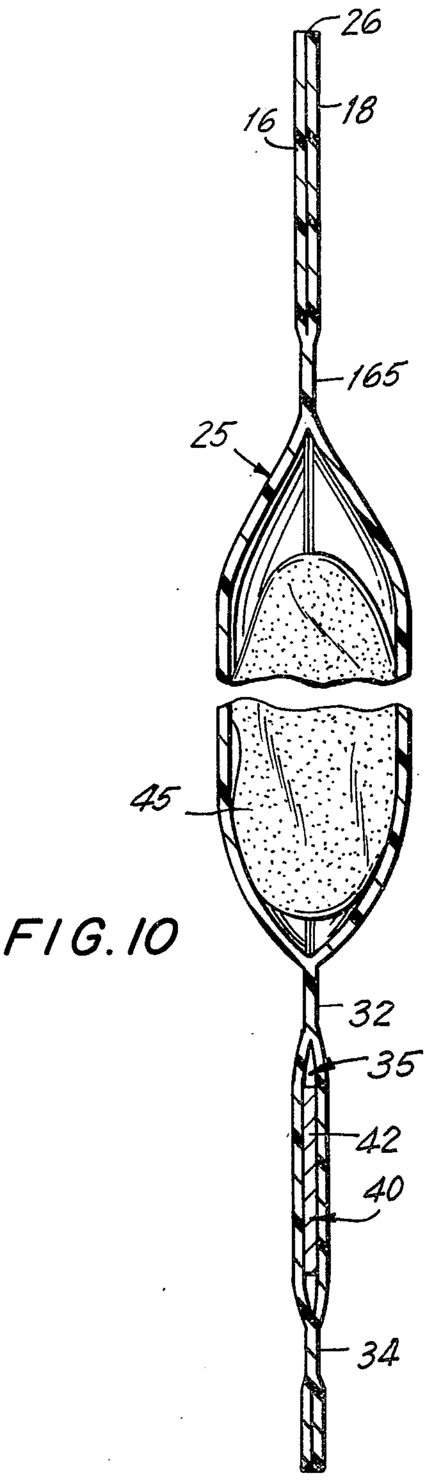
FIG. 10
FIG. 11
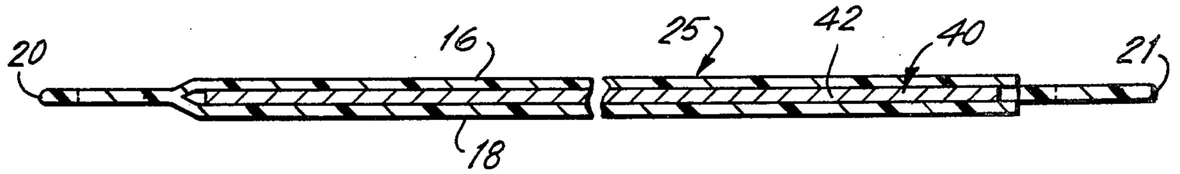

HOME BAG SEALER

BACKGROUND OF THE INVENTION

The invention relates to apparatus for forming individual plastic bags of a desired length and thereafter sealing the open end thereof with contents therein.

The use of plastic bags in the home for a variety of applications has grown tremendously over the last decade. Although it has been proposed that the consumer purchase a variety of different sized bags that he may seal himself, this requires purchase and storage of a complete inventory. In addition, since these bags are often placed in a freezer for storage with the contents therein, it is also most important to be able to identify the contents as well as date when the bag was sealed and placed in the freezer.

Certain bag forming apparatus has been proposed as shown in U.S. Pat. No. 3,915,077. The equipment illustrated in this patent is complicated in nature since it is directed to bags for packaging such as in supermarkets that are given to the customers with their food purchase therein.

Accordingly, the inventor has found a need for a device, particularly suitable for home use, in which the consumer may purchase a continuous roll of flattened tubular stock material and form their own bag to a desired length, having a pouch therein for the insertion of a label or the like identifying the contents of the bag and also to permit the sealing thereof.

OBJECTS OF THE INVENTION

An object of the present invention is to provide apparatus for forming plastic bags of desired length from flattened plastic tubular stock material and subsequently sealing them at the open end thereof.

Another object of the present invention is to provide apparatus ideally suited for consumer use to produce plastic bags for storage of food and other items therein.

Another object of the present invention is to provide apparatus which facilitates the consumer in the production of plastic bags of various lengths.

Another object of the present invention is to provide apparatus for forming bags that is economical to manufacture so as to be priced within the framework of consumer products.

Other objects and advantages of the present invention will become apparent as the disclosure proceeds.

SUMMARY OF THE INVENTION

The present invention provides a bag forming and sealing device or apparatus for forming bags of desired length from flattened plastic tubular stock material and thereafter sealing same with the contents therein. The apparatus includes housing means having a cover hingeably secured to the housing means and defining an entrance opening adapted to receive therethrough a supply roll of the flattened stock material. Supporting means within the housing means is adapted for rotatably mounting a supply roll of the flattened stock material which is fed between guide means provided in vertically spaced relationship to the supporting means within the housing means, and including a pair of spaced apart transversely extending guide members adapted to receive the stock therebetween.

Advancing means is provided adjacent the guide means and includes a pair of rollers for engagement with the stock within the housing means in vertically spaced apart relationship to the guide means. Base means is contained adjacent the advancing means in the housing means, and having a support surface across which the stock is adapted to be advanced from the supply roll by the advancing means through the guide means. First heat sealing means is mounted within the housing means in substantially parallel spaced apart relationship to the base means. The first heat sealing means includes upper and lower transversely extending vertically spaced apart heating elements adapted to form in the stock a pair of heat sealed seams.

Reciprocating means is provided for moving the base means and the first heat sealing means towards and away from each other so as to have the heating elements engage the stock on the support surface and thereby form the heat sealed seams. First cutting means to form a vertically extending slit between the seams so as to provide a pocket therein is operatively associated with the reciprocating means. Second cutting means to sever the stock along a line adjacent and forwardly of the lowermost of the seams is also operatively associated with the reciprocating means, such that a previously formed bag is released from the housing means.

Energizing means is operatively associated with the advancing means, the first heat sealing means, reciprocating means and the first and second cutting means, such that the stock is initially moved by the advancing means between the first heat sealing means and the base means to a position to activate the reciprocating means so as to form the seams and the first and second cutting means forming a vertical slit and cutting off a previously formed bag. An exit opening on the housing means is provided in substantial alignment with the second cutting means for permitting the formed bag to be freely removed from the housing means.

When the bag is formed to the desired length and the contents positioned therein, the user may then seal the open end or top of the bag. To perform this operation holding means is provided that is operatively associated with the housing means for releasably retaining a bag formed by the apparatus with contents therein. Second heat sealing means is operatively associated with the holding means and adapted to seal the open end of the bag retained by the holding means. In this manner a complete package may be formed by the user in the home, office, etc.

In accordance with a preferred embodiment, the holding means includes a pair of spaced apart transversely extending pins to mate with apertures provided adjacent each vertical edge of the bag, such that a bag with the contents therein may be supported during operation of the closure means. The second heat sealing means may include a closure heating element transversely mounted, and a pivotally mounted anvil manually operable by the user of the apparatus to apply a compressive force to the stock to abut the closure heating element and form a closure at the open end of a bag to seal the contents therein for storage thereof. Preferably the housing means is adapted to be vertically mounted on a wall or the like, with the entrance opening at the upper end of the housing means and the exit opening at the lower end of the housing means.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is a fragmentary view similar to FIG. 3 illustrating the apparatus in operation;

FIG. 7 is a front plan view illustrating a bag formed in accordance with the apparatus of the present invention having contents inserted therein and a label inserted in the pouch that is formed;

FIG. 8 is a section view illustrating the manner in which the closure at the open end of the bag is formed;

FIG. 9 is a perspective view of a bag that has been produced and sealed with the contents therein in accordance with the present invention;

FIG. 10 is a sectional view along the line 10—10 of FIG. 9;

FIG. 11 is a sectional view along the line 11—11 of FIG. 9; and

DETAILED DESCRIPTION OF THE DRAWINGS

Figure 1:
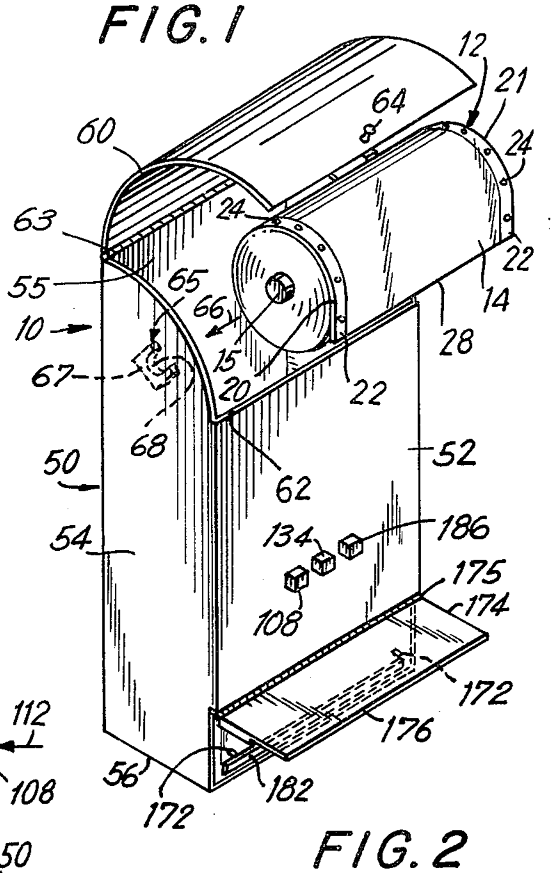
FIG. 1 is a perspective view illustrating one form of housing means showing a roll of plastic tubular stock material about to be inserted therein.

Referring now to the drawings, initially to FIGS. 1–6 thereof, there is illustrated apparatus or a device 10 for forming bags of desired length from a roll 12 of flattened plastic tubular stock material. The plastic tubular stock material 14 is supplied in a roll 12 surrounding a support shaft 15. The consumer or user of the apparatus 10 will from time to time purchase one or more rolls 12 of plastic stock material 14. The plastic stock material 14 includes two layers or sheets 16 and 18 extending in overlapping relationship to each other. The sheets 16 and 18 are either formed from tubular stock or may be sealed at the respective vertically extending edges 20 and 21. Adjacent each edge 20 and 21 is a flattened portion 22 that may include a plurality of vertically disposed apertures 24 that are utilized for subsequently retaining a formed bag 25 as the open upper end 26 thereof is subsequently sealed.

The roll 14 of plastic stock material has a forward edge 28 that will be advanced through the apparatus 10 to form a considerable number of individual plastic bags 25, as illustrated with respect to FIG. 7–11. As illustrated therein, each formed bag 25 includes the open upper end 26 and a bottom end 30 with the vertically extending apertures along each marginal edge 22. In addition, the bag 25 is formed with a pair of heat sealed seams, referred to herein as the upper seam 32 and lower seam 34. Between the seams 32 and 34 is a horizontally extending pouch 35 having a vertically extending entrance opening 36 which may extend between the seams 32 and 34 substantially the full width thereof. The opening 36, which is in the form of a slot that is produced by the apparatus 10 through either one layer 16 or both layers 16 and 18, permits the insertion within the pouch or pocket 35 of indicia means 40, which may be in the form of a label, tab, etc., indicated at 42, which is inserted within the pouch 35 in the direction of arrow 44 as illustrated in FIG. 7.

In this manner the individual user will be able to produce from the roll 12 individual bags 25 of any desired length and thereafter properly identify the contents 45 to be inserted therein in the direction of arrow 46 prior to storage thereof. Although many items will be stored in a freezer for future use, there are also those items that one wishes to seal to prevent corrosion thereof, etc. Therefore, although the present invention is being illustrated for use with food products, generally used in the home, it is appreciated that office, industrial, hospital, and restaurant uses are also ideally suited for the present invention.

As illustrated in FIG. 1, the procedure for forming the bag 25 is initially placing the roll 12 within the housing means 50, which includes a cabinet that may take various shapes and forms. The housing means 50 includes a front wall 52, spaced apart side or end walls 54, as well as a rear wall 55 with a bottom wall 56 at the lower end of the housing means 50. The housing means 50 is preferably mounted on a vertical wall 58 and is retained thereon by screws, etc., not shown.

A cover 60 is hingeably secured to the housing means 50 and defines an entrance opening 62 adapted to receive therethrough the supply roll 12. The cover 60 may have a transversely extending hinge 63 connected to the cover 60 and rear wall 55. A knob 64 is provided to facilitate opening of the cover 60. The housing means 50 and cover 60 may be manufactured from metallic or plastic materials.

Supporting means 65 is contained within the housing means 50 for rotatably mounting the supply roll 12 which is inserted in the direction of arrow 66. The supporting means 65 may include a bracket 67 mounted on each end wall 54 and having a recess 68 for receiving each end of the support shaft 15.

To assist in the initial threading of the forward edge 28 of the stock 14, guide means 70 is provided in vertically spaced relationship to the supporting means 65. The guide means 70 may include a pair of spaced apart transversely extending guide members 72 having an angular taper to facilitate the stock 14 to move therethrough in the direction of arrow 73.

To move the stock 14 through the apparatus 10 in order to perform the subsequent operation thereto, advancing means 75 is utilized. The advancing means is in vertically spaced relationship below the guide means 70 and includes an upper pair of rollers 76 and 78 extending transversely between the end walls 54 of the housing means 50. A lower pair of rollers 80 and 82 extend in vertically spaced relationship to the upper rollers 76 and 78. The function of the respective rollers 76, 78, 80 and 82 is to grip the sheets 16 and 18 and advance same from the roller 12 through the apparatus 10.

Figure 2:
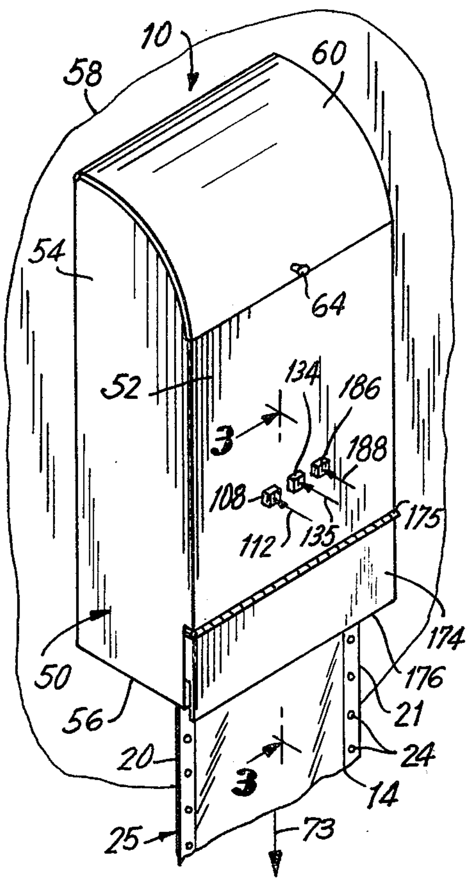
FIG. 2 is a perspective view similar to FIG. 1 with the housing means in the closed position and operational.

As illustrated in FIGS. 3–6, motor means 85 is utilized in conjunction with the advancing means 75. Each respective roller 76, 78, 80, and 82 is mounted on a roller shaft 86 and adapted to freely rotate within a seat 87 provided on the respective side walls 54 of the housing means 50. The rollers and the respective roller shafts may be made from plastic or metallic materials provided ample frictional engagement is produced to advance the material stock 14 therebetween. With the respective rollers mounted in fixed relationship to each other, the motor means 85 is mechanically coupled to the advancing means 75 for rotation of the rollers in a given direction. The advancing means 75 remains operational until the desired length of stock 14 exits from the bottom end 56 as illustrated in FIG. 2. The user can then visually see how long the bag is prior to discontinuing the advancing means, as hereinafter described.

Figure 5:
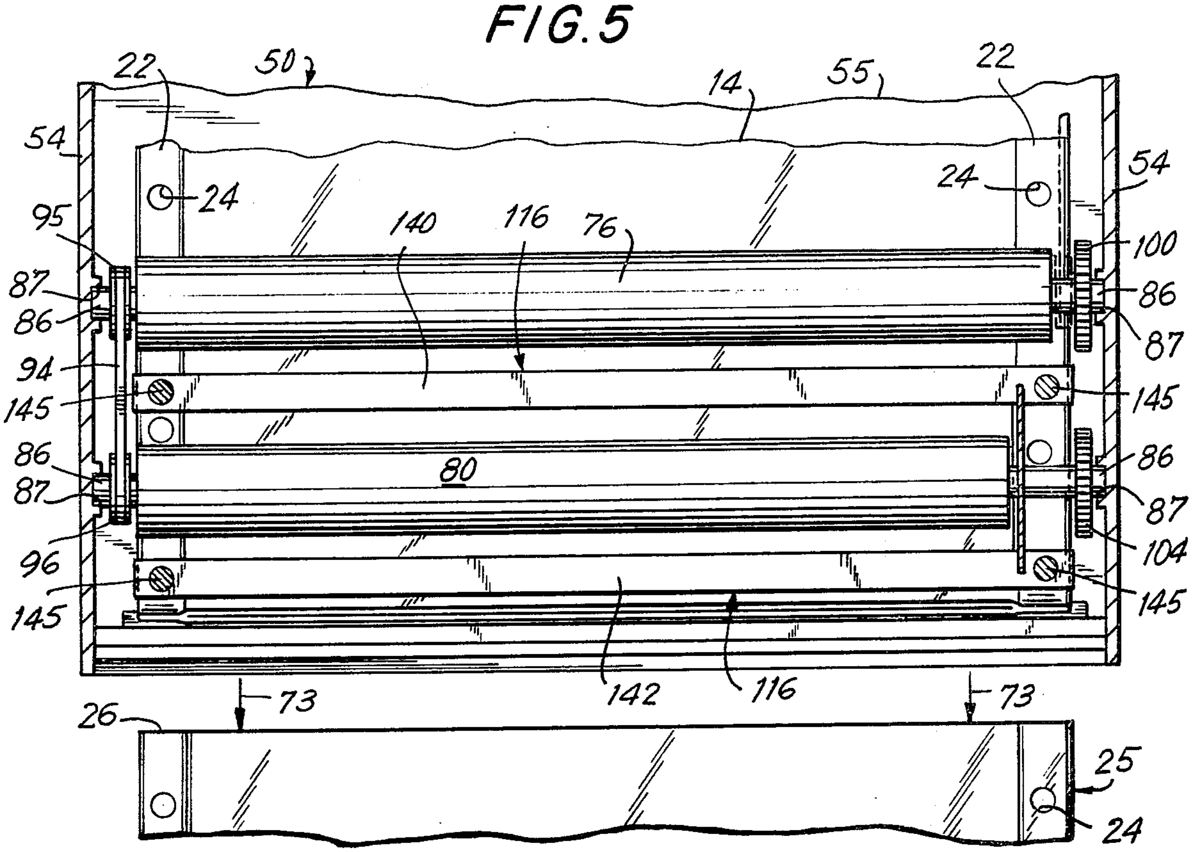
FIG. 5 is a sectional view along the line 5—5 of FIG. 4.

The motor means 85 includes a motor 90 that may be mounted on the rear wall 55 and having a pulley 91 associated therewith for movement in the direction of arrow 92. As seen in FIG. 5, rollers 76 and 80 are mechanically coupled to each other by a belt 94 extending over pulleys 95 and 96 mounted respectively on shafts 86 associated with rollers 76 and 80. Roller 78 has associated therewith pulley 98 to receive thereon one end of pulley belt 91. Roller 76 is mechanically coupled to roller 78 by a pair of gears 100 and 102 which mesh with each other for rotating the rollers 76 and 78 towards each other, as indicated by arrows 103.

In similar fashion gear 104 is operatively associated with roller 80 and gear 106 is operatively associated with roller 82. Accordingly, when the motor means is activated by switch 108, which essentially forms part of the energizing means 110, the belt 91 rotates causing the rotation of roller 78 through gear 102 to be transmitted to gear 100 to induce rotation in roller 76. In turn the belt 94 couples rollers 76 and 80 together to induce rotation in roller 80. In turn, gear 104 mounted relative to roller 80 induces rotation in roller 82 through gear 106. Accordingly, the advancing switch 108 mounted on front wall 52 of the housing means is activated and the motor 90 rotates until the force applied in the direction of arrow 112 is removed from the switch 108. When this occurs, the advancing means 75 stops and there extends from the housing means 50 a length of stock material, as seen in FIG. 2. Once the length has been selected, the apparatus 10 then performs the additional steps of cutting the bag and forming the spaced apart seams 32 and 34 as well as the slot 36. This is preferably performed in a single operation.

To perform the next operation, base means 115 and first heat sealing means 116 are utilized in conjunction with reciprocating means 118. The base means 115 is mounted adjacent the advancing means 75 and includes an upper support surface 120 and lower support surface 122. The upper support surface 120 is at the front end of a first section 124 which may be interposed between rollers 78 and 82. The lower support surface 122 may form the forward edge of the second section 125 mounted in vertically spaced relationship to the first section 124.

The respective sections 124 and 125 may be secured together by a vertically extending plate 126 to form a unitary structure, with the rear end 128 coupled to a shaft 130 forming part of the reciprocating means 118. The reciprocating means 118 further includes a solenoid 132 mounted to the rear wall 55 of the housing means 50. The solenoid 132 is wired to reciprocating switch 134, which when depressed in the direction of arrow 135 will move the shaft 130 which suspends the bracket 119 with respect thereto. The bracket 119 reciprocates in the direction of double headed arrow 136 by a predetermined stroke.

Figure 3:
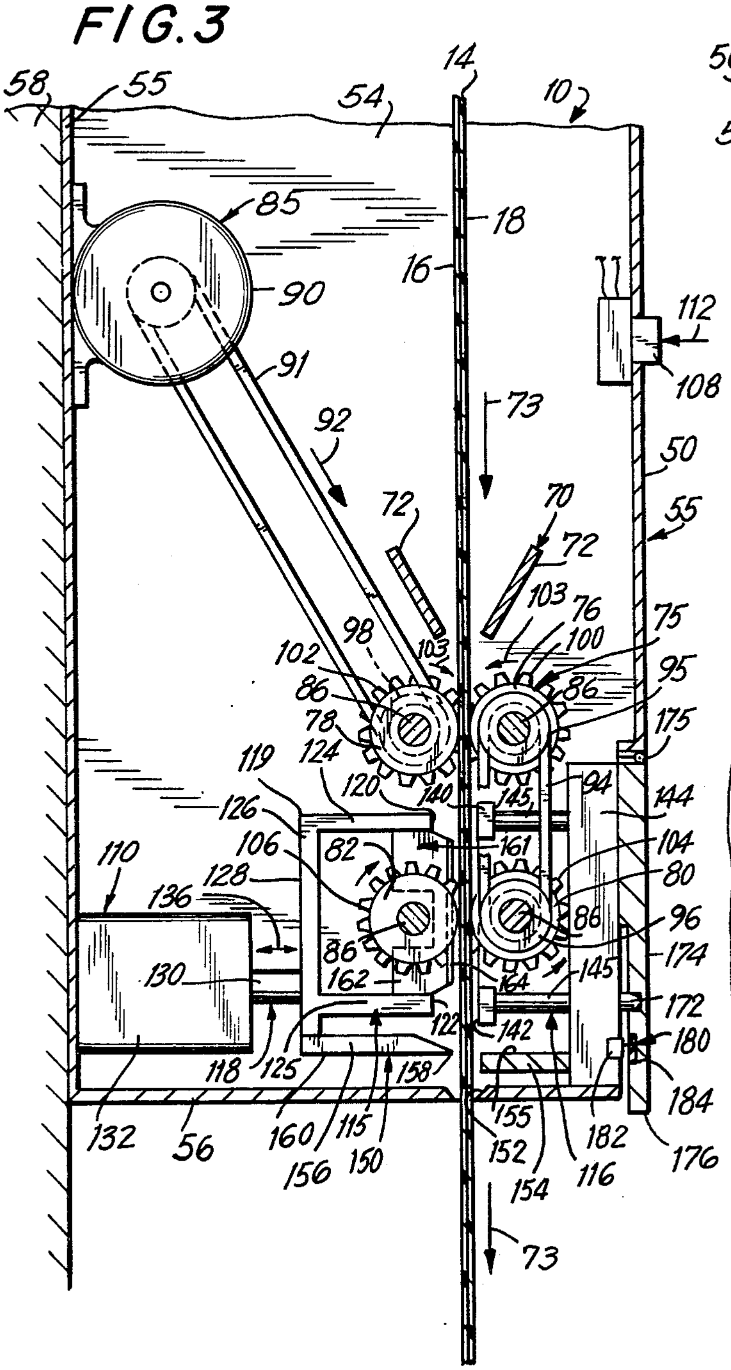
FIG. 3 is a fragmentary sectional view along the line 3—3 of FIG. 2.

FIG. 3 illustrates the bracket 119 in its retracted position. In comparison, FIG. 4 illustrates the bracket in its forward position in operative relationship to the first sealing means 116. To perform the sealing function, the first sealing means is mounted in substantially parallel spaced apart relationship to the base means 115. As illustrated in FIG. 3, the advancing means 75 may advance the stock 14 downwardly without any resistance. The first heat sealing means 116 includes an upper transversely extending heating element 140 and a lower heating element 142 in vertically spaced relation to the upper heating element 140. The heating means 116 may take various forms and may include a mounting block 144 extending from the lower end 56 of the housing means 50. Support rods 145 mechanically couple the heating elements 140 and 142 to the block 144. The apparatus 10 may be electrically wired such that when the advancing switch 108 is activated the first heat sealing means 116 is simultaneously energized to heat the heating element 140 and 142 to a desired temperature.

Once the heating elements 140 and 142 are heated, then the movement by the reciprocating means 118 to the position illustrated in FIG. 4 will compress the sheets 16 and 18 positioned therebetween, and the seals or seams 32 and 34, as illustrated in FIG. 7, are formed. The reciprocating means 118 thereafter automatically retracts the bracket 119 with the first section 124 and second section 125 extending outwardly therefrom. In this manner the heating elements 140 and 142 engage the stock 14 on the support surfaces 120 and 122 to thereby form the heat sealed seams 32 and 34. The stock material 14 after it is cut by the first cutting means 150 will fall from the housing means 50 through the exit opening 152 at the lower end 56. In this manner the housing means 50, which is adapted to be vertically mounted on a wall 58, has the roll 14 introduced through the entrance opening 62 and processed in the apparatus 10.

The first cutting means 150 is provided below the base means 115 and first heat sealing means 116 to form the bottom end 30 of the bag 25. The cutting means 150 may include a cutting plate 154 extending inwardly from the mounting block 144 and having an upper surface 155. A blade 156 is mounted at the bottom end of bracket 119 and includes a cutting edge 158. The bottom edge or surface 160 of blade 156 extends in a plane parallel to the upper surface 155 of plate 154. Upon activation of the reciprocating means 118, as illustrated in FIG. 4, the stock 14 is cut and a new bag 25 drops through the exit opening 152 and is available for subsequent use.

Simultaneously with the operation of the first cutting means 150, second cutting mans 161 is simultaneously activated to form the substantially vertical slot 36 in the bag 25. The second cutting mens 161 includes a vertically extending blade 162, as illustrated in FIGS. 3 and 4, having cutting edge 164 which cuts through the sheets 16 and 18 simultaneously with the seams 32 and 34 being formed and the stock 14 being severed by the first cutting means 150. The blade 162 may be vertically mounted between the respective sections 124 and 125 on bracket 119. It is appreciated and understood that subsequent to the operation illustrated in FIG. 4 the bag 25 that drops therefrom is the one that is next used. Therefore the apparatus 10 contains therein the lower end of a bag which has the seams 32 and 34 formed therein as well as the slot 36 in order to form the pouch 35. At such time in the future as the user activates the switch 108, the advancing means 75 will advance from the housing means 50 a length of stock 14 which has the bottom end formed in a manner as described above. Subsequent thereto, when the switch 134 is activated, the first cutting means 150 will sever the stock 14 such that the open end 26 of the bag 25 is formed.

Figure 6:
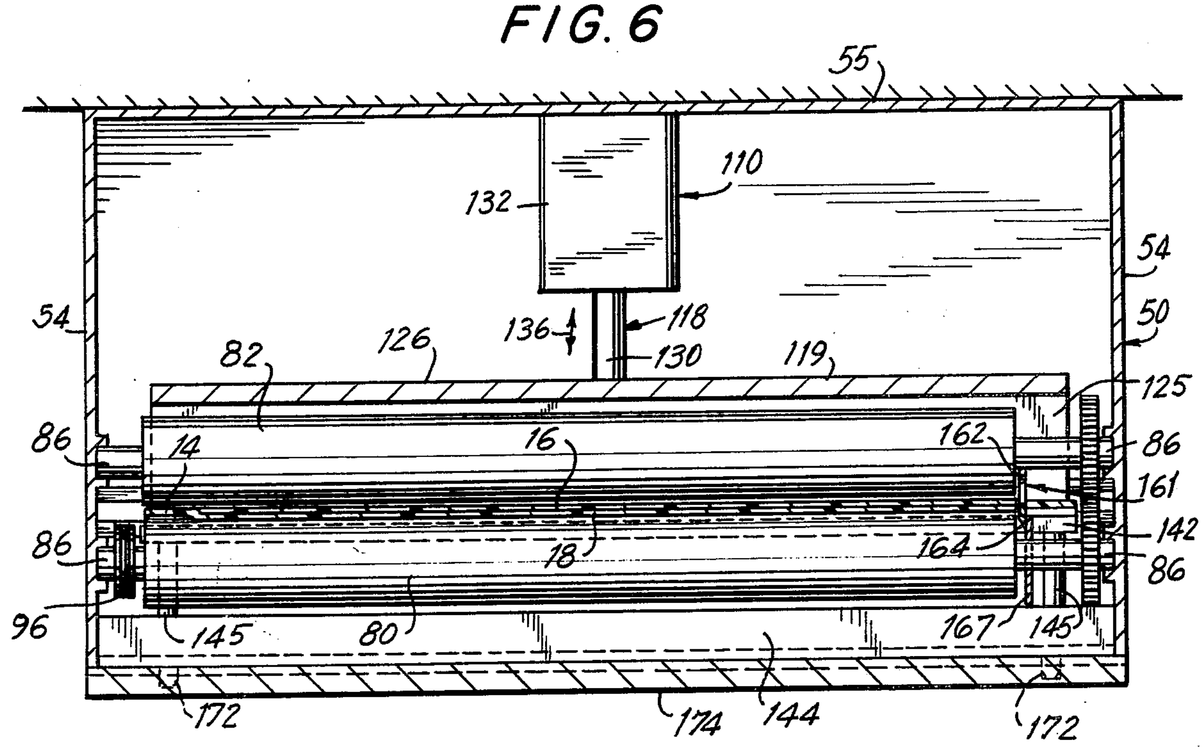
FIG. 6 is a sectional view along the line 6—6 of FIG. 4.

The apparatus 10 also makes provision such that the user may introduce the contents 45 within the bag 25 and subsequently sealed the open end thereof, as illustrated in FIG. 8, to form the sealed bag 25, as illustrated in FIG. 9–11. As illustrated in FIG. 6, a cutting guide 167 acts in cooperation with the cutting blade 162 as the latter moves towards and away from the cutting guide 167 to form the entrance opening 36.

To accomplish obtaining a closure or heat seam 165 at the upper end 26 of the bag 25, holding means 170 is operatively associated with the housing means 50 for releasably retaining a bag 25 formed by the apparatus 10 with contents 45 therein. The holding means 170 may include a pair of spaced apart transversely extending pins 172 to mate with the apertures 24 provided along each of the respective sides or vertical edges 22 of the stock 14. The pins 172 may extend outwardly from the mounting block 144 and accessible to by a closure door 174 extending across the bottom end of the housing means 50. The closure door 174 is connected by hinge 175 to the front panel 52 of the housing means 50. The front door or panel 174 may have a terminal end 176 that extends below the bottom end 56 of the housing means 50.

In this manner the panel 174 may be readily lifted to obtain access to the pins 172 of the holding means 170. Once the panel 174 is lifted, a bag 25 may be positioned on the pins such that the second heat sealing means 180 may now be utilized to form the closure 165 at the open end 26 of the bag 25. The second heat sealing means 180 includes a transversely extending heating element 182 that extends across the width of the housing means and below the holding means 170. The heating element, or closure element, 182 operates in conjunction with the door 174 which also acts as a pivotally mounted anvil having a support plate 184 mounted therein. The support plate 184 applies a compressed force to the stock 14 to abut the closure heating element 182 to form the closure 165 thereacross. In this manner a bag of desired length is formed with the contents therein for storage thereof. Switch 186 is wired to the second heat sealing means 180 to elevate the temperature thereof in contemplation of forming the closure 165. The switch 186 when depressed in the direction of arrow 188 will energize the second heating means 180 to heat the element 182 and bring it to its necessary temperature. In this manner the bag 25 is formed and either before or after the seal 165 is made the indicia means 40 may be inserted within the pouch or pocket 35. In this way the user may easily insert the necessary information as to the contents 45 therein.

Figure 12:
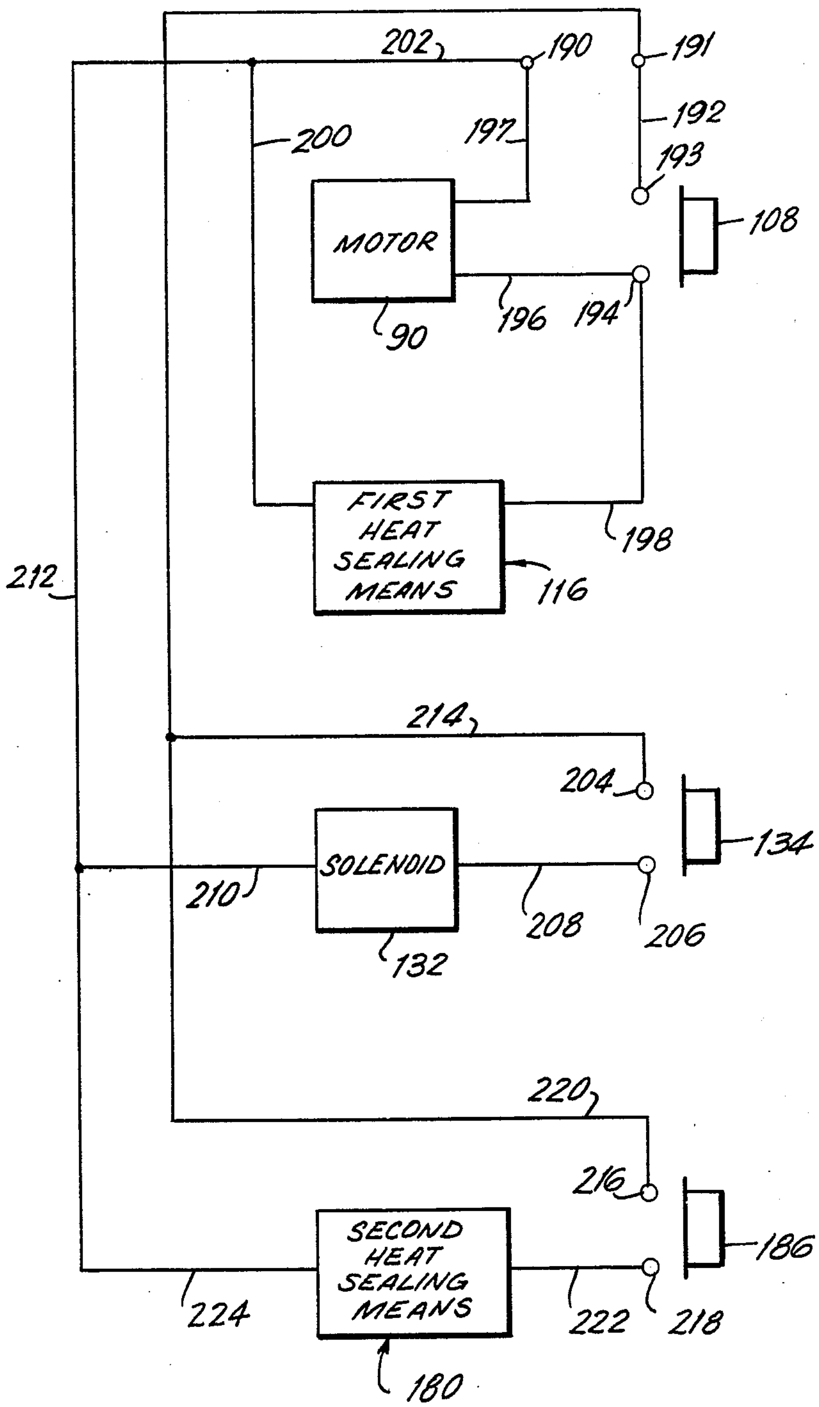
FIG. 12 is a diagrammatic view illustrating the electromechanical wiring of the present invention.

FIG. 12 illustrates in schematic form the electrical wiring of the unit to accomplish the desired end result. Although three switches have been illustrated in use, it is appreciated that even one or two switches may be utilized to obtain the same end results. Accordingly, the form of wiring in FIG. 12 is merely illustrative and various timers, etc., may be utilized. As illustrated, conventional house current is supplied to terminals 190 and 191. Lead 192 is wired to one terminal 193 of switch 108. The opposite terminal 194 of switch 108 may be wired by lead 196 to the motor 90. Lead 197 of motor 90 is wired to power terminal 190.

The first heat sealing means 116 may be connected by lead 198 to terminal 194 and the opposite lead 200 to terminal 190 via lead 202. In this manner when the switch 108 is depressed the motor 90 and first heat sealing means 116 will be activated for the period of time that the advancing means 75 advances stock 14 from the roll 12. When this operation is completed and it is desired to cut a bag 25 from the stock 14, switch 134 is activated. Switch 134 includes terminals 204 and 206. Terminal 206 is wired by lead 208 to the solenoid 132. Lead 210 is connected to lead 212, which is in turn connected by lead 202 to power terminal 190. Switch terminal 204 is connected by lead 214 to the other power terminal 191. The solenoid 132 is therefore activated by switch 134.

Switch 186 activates the second heat sealing means 180 and includes terminals 216 and 218. Terminal 216 is connected by lead 220 to power terminal 191. Terminal 218 is connected by lead 222 to the second heat sealing means 180. Lead 224 connects heat sealing means 180 to terminal 190. In this manner the second heat sealing means 180 is elevated in temperature in order to form the closure at the upper end of the bag 25.

Accordingly, there has been described and illustrated a novel apparatus that is simple in operation and ideally suited for consumer use. This device overcomes the objections of the consumer in having to purchase a variety of different size bags for use in the home. The apertures provided on each side of the bag may also be used for hanging the bag during storage if so desired. The apparatus 10 is operated on conventional house current and is only on when the switches are engaged. Although the cutting operations and initial sealing are formed in one operation, it is appreciated that dual operations could be employed, but this would be an additional inconvenience to the user.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. Apparatus for forming bags of desired length from flattened plastic tubular stock material, comprising a. housing means, b. supporting means within said housing means for rotatably mounting a supply roll of said flattened stock material, c. guide means in vertically spaced relationship to said supporting means within said housing means and including a pair of spaced apart transversely extending guide members adapted to receive said stock therebetween, d. advancing means including a pair of rollers for engagement with said stock within said housing means in vertically spaced apart relationship to said guide means, e. base means adjacent said advancing means in said housing means, and having a support surface across which said stock is adapted to be advanced from said supply roll by said advancing means through said guide means, f. heat sealing means mounted within said housing means in substantially parallel spaced apart relationship to said base means, said heat sealing means including upper and lower transversely extending vertically spaced apart heating elements adapted to form in said stock a pair of heat sealed seams, g. reciprocating means for moving said base means and said heat sealing means towards and away from each other so as to have said heating elements engage said stock on said support surface and thereby form said heat sealed seams, h. first cutting means to form a vertically extending slit between said seams so as to provide a pocket therein, i. second cutting means to sever said stock along a line adjacent and forwardly of the lowermost of said seams, such that a previously formed bag is released from said housing means, and j. energizing means operatively associated with said advancing means, said heat sealing means, said reciprocating means and said first and second cutting means, such that said stock is initially moved by said advancing means between said heat sealing means and said base means to a position to activate said reciprocating means so as to form said seams and said first and second cutting means forming a vertical slit and cutting off a previously formed bag.

2. Apparatus as defined in claim 1, wherein said advancing means includes:

a. an upper part of rollers extending transversely between said guide means and said upper heating element, and b. a lower pair of rollers extending transversely between said upper heating element and said lower heating element.

3. Apparatus as defined in claim 2, wherein said support surface of said base means includes:

a. a first section mounted in spaced relationship to said upper heating element between said upper and lower pairs of said rollers, and b. a second section mounted in vertically spaced relationship to said first section and mounted between said lower pair of rollers and said cutting means.

4. Apparatus lower defined in claim 1, wherein said second cutting means includes a transversely extending cutter having a cutting edge to cut across the full width of said stock and moved into and out of engagement with said stock by said reciprocating means.

5. Apparatus as defined in claim 1, and further including motor means mechanically coupled to said advancing means for rotation of said rollers in a given direction, said motor means coupled to said energizing means and adapted to advance said stock until the desired length thereof exits from said housing means and thereafter said reciprocating is activated.

6. Apparatus as defined in claim 1, wherein said housing means includes a cover hingeably secured thereto and defining an entrance opening adapted to receive therethrough a supply roll of said flattened stock material.

7. Apparatus as defined in claim 6, and further including an exit opening on said housing means in substantial alignment with said second cutting means for permitting the formed bag to freely be removed from said housing means.

8. Apparatus as defined in claim 7, a. wherein said housing means is adapted to be vertically mounted on a wall or the like, b. said entrance opening is at the upper end of said housing means, and c. said exit opening is at the lower end of said housing means.

9. Apparatus as defined in claim 1, and further including:

a. holding means operatively associated with said housing means for releasably retaining a bag formed by the apparatus, and b. closure means operatively associated with said holding means and adapted to seal the open end of the bag retained by said holding means.

10. Apparatus as defined in claim 9, wherein said holding means includes a pair of spaced apart transversely extending pins to mate with apertures provided adjacent each vertical edge of the bag, such that a bag with contents therein may be supported during operation of said closure means.

11. Apparatus as defined in claim 9, wherein said closure means includes:

a. a closure heating element transversely mounted, and b. a pivotally mounted anvil manually operable by the user of the apparatus to apply a compressive force to said stock to abut said closure heating element and form a closure at the open end of a bag to seal the contents therein for storage thereof.

12. Apparatus as defined in claim 1, wherein said guide means includes a pair of transversely extending plates inwardly tapered to form an opening in vertical alignment with said advancing means.

13. Apparatus as defined in claim 1, wherein said base means includes a bracket having said support surface thereon with said first and second cutting means coupled thereto for movement by said reciprocating means towards and away from said heat sealing means.

14. Apparatus as defined in claim 13, wherein said second cutting means extends below said support surface.

15. Apparatus for forming bags of desired length from flattened plastic tubular stock material and thereafter sealing same with contents therein, comprising a. housing means, b. a cover hingeably secured to said housing means and defining an entrance opening adapted to receive therethrough a supply roll of said flattened stock material, c. supporting means within said housing means for rotatably mounting a supply roll of said flattened stock material, d. advancing means including a pair of rollers for engagement with said stock within said housing means in vertically spaced apart relationship to said guide means, e. base means adjacent said advancing means in said housing means, and having a support surface across which said stock is adapted to be advanced from said supply roll by said advancing means through said guide means, f. first heat sealing means mounted within said housing means in substantially parallel spaced apart relationship to said base means, said first heat sealing means including upper and lower transversely extending vertically spaced apart heating elements adapted to form in said stock a pair of heat sealed seams, g. reciprocating means for moving said base means and said first heat sealing means towards and away from each other so as to have said heating elements engage said stock on said support surface and thereby form said heat sealed seams, h. first cutting means to form a vertically extending slit between said seams so as to provide a pocket therein, i. second cutting means to sever said stock along a line adjacent and forwardly of the lowermost of said seams, such that a previously formed bag is released from said housing means, j. energizing means operatively associated with said advancing means, said first heat sealing means, said reciprocating means and said first and second cutting means, such that said stock is initially moved by said advancing means between said first heat sealing means and said base means to a position to activate said reciprocating means so as to form said seams and said first and second cutting means forming a vertical slit and cutting off a previously formed bag, k. an exit opening on said housing means in substantial alignment with said second cutting means for permitting the formed bag to be freely removed from said housing méans, l. holding means operatively associated with said housing means for releasably retaining a bag formed by the apparatus with contents therein, and m. second heat sealing means operatively associated with said holding means and adapted to seal the open end of the bag retained by said holding means.

16. Apparatus as defined in claim 15, wherein said holding means includes a pair of spaced apart transversely extending pins to mate with apertures provided adjacent each vertical edge of the bag, such that a bag with the contents therein may be supported during operation of said closure means.

17. Apparatus as defined in claim 15, wherein said second heat sealing means includes:

a. a closure heating element transversely mounted, and b. a pivotally mounted anvil manually operable by the user of the apparatus to apply a compressive force to said stock to abut said closure heating element and form a closure at the open end of a bag to seal the contents therein for storage thereof.

18. Apparatus as defined in claim 15, a. wherein said housing means is adapted to be vertically mounted on a wall or the like, b. said entrance opening is at the upper end of said housing means, and c. said exit opening is at the lower end of said housing means.

19. Apparatus as defined in claim 15, wherein said advancing means includes:

a. an upper pair of rollers extending transversely between said guide means and said upper heating element, and b. a lower pair of rollers extending transversely between said upper heating element and said lower heating element.

20. Apparatus as defined in claim 15, wherein said support surface of said base means includes:

a. a first section mounted in spaced relationship to said upper heating element between said upper and lower pairs of said rollers, and b. a second section mounted in vertically spaced relationship to said first section and mounted between said lower pair of rollers and said cutting means.

21. Apparatus as defined in claim 15, wherein said second cutting means includes a transversely extending cutter having a cutting edge to cut across the full width of said stock and moved into and out of engagement with said stock by said reciprocating means.

22. Apparatus as defined in claim 15, and further including motor means mechanically coupled to said advancing means for rotation of said rollers in a given direction, said motor means coupled to said energizing means and adapted to advance said stock until the desired length thereof exits from said housing means and thereafter said reciprocating means is activated.

23. Apparatus as defined in claim 15, and further including guide means in vertically spaced relationship to said supporting means within said housing means and including a pair of spaced apart transversely extending guide members adapted to receive said stock therebetween.

24. Apparatus as defined in claim 23, wherein said guide means includes a pair of transversely extending plates inwardly tapered to form an opening in vertical alignment with said advancing means.

25. Apparatus for forming bags of desired length from flattened plastic tubular stock material and thereafter sealing same with contents therein, comprising a. housing means, b. a cover hingeably secured to said housing means and defining an entrance opening adapted to receive therethrough a supply roll of said flattened stock material, c. supporting means within said housing means for rotatably mounting a supply roll of said flattened stock material, d. guide means in vertically spaced relationship to said supporting means within said housing means and including a pair of spaced apart transversely extending guide members adapted to receive said stock therebetween, e. advancing means including a pair of rollers for engagement with said stock within said housing means in vertically spaced apart relationship to said guide means, f. base means adjacent said advancing means in said housing means and having a support surface across which said stock is adapted to be advanced from said supply roll by said advancing means through said guide means, g. first heat sealing means mounted within said housing means in substantially parallel spaced apart relationship to said base means, said first heat sealing means including upper and lower transversely extending vertically spaced apart heating elements adapted to form in said stock a pair of heat sealed seams, h. said advancing means including:

1. an upper pair of rollers extending transversely between said guide means and said upper heating element, and 2. a lower pair of rollers extending transversely between said upper heating element and said lower heating element i. said support surface of said base means including:

1. a first section mounted in spaced relationship to said upper heating element between said upper and lower pairs of said rollers, and 2. a second section mounted in vertically spaced relationship to said first section and mounted between said lower pair of rollers and said cutting means j. reciprocating means for moving said base means and said first heat sealing means towards and away from each other so as to have said heating elements engage said stock on said support surface and thereby form said heat sealed seams, k. motor means mechanically coupled to said advancing means for rotation of said rollers in a given direction, said motor means coupled to said energizing means and adapted to advance said stock until the desired length thereof exits from said housing means and thereafter said reciprocating is activated, l. first cutting means to form a vertically extending slit between said seams so as to provide a pocket therein, m. second cutting means to sever said stock along a line adjacent and forwardly of the lowermost of said seams, such that a previously formed bag is released from said housing means, n. energizing means operatively associated with said advancing means, said first heat sealing means, said reciprocating means and said first and second cutting means, such that said stock is initially moved by said advancing means between said first heat sealing means and said base means to a position to activate said reciprocating means so as to form said seams and said first and second cutting means forming a vertical slit and cutting off a previously formed bag, o. an exit opening on said housing means in substantial alignment with said second cutting means for permitting the formed bag to be freely removed from said housing means, p. holding means operatively associated with said housing means for releasably retaining a bag formed by the apparatus with contents therein, said holding means including a pair of spaced apart transversely extending pins to mate with apertures provided adjacent each vertical edge of the bag, and q. second heat sealing means operatively associated with said holding means and adapted to seal the open end of the bag retained by said holding means.

26. Apparatus as defined in claim 25, wherein said second heat sealing means includes:

a. a closure heating element transversely mounted, and b. a pivotally mounted anvil manually operable by the user of the apparatus to apply a compressive force to said stock to abut said closure heating element and form a closure at the open end of a bag to seal the contents therein for storage thereof.

27. Apparatus as defined in claim 25, a. wherein said housing means is adapted to be vertically mounted on a wall or the like, b. said entrance opening is at the upper end of said housing means, and c. said exit opening is at the lower end of said housing means.

28. Apparatus as defined in claim 25, wherein said second cutting means includes a transversely extending cutter having a cutting edge to cut across the full width of said stock and moved into and out of engagement with said stock by said reciprocating means.

29. Apparatus as defined in claim 25, wherein said guide means includes a pair of transversely extending plates inwardly tapered to form an opening in vertical alignment with said advancing means.

30. Apparatus as defined in claim 25, wherein said base means includes a bracket having said first and second sections extending therefrom with said first and second cutting means coupled thereto for movement by said reciprocating means towards and away from said first heat sealing means.

* * * * *